United States Patent [19]

Strobl

[11] Patent Number: 4,983,872

[45] Date of Patent: Jan. 8, 1991

[54] BRUSH GEAR FOR A PERMANENT MAGNET MOTOR

[75] Inventor: Georg Strobl, Repulse Bay, Hong Kong

[73] Assignee: Johnson Electric S.A., La Chaux de Fonds, Switzerland

[21] Appl. No.: 357,946

[22] Filed: May 30, 1989

[30] Foreign Application Priority Data

Jun. 6, 1988 [GB] United Kingdom ............... 8813370

[51] Int. Cl.$^5$ ................. H02K 5/14; H01R 39/38; H02K 13/00

[52] U.S. Cl. .................. 310/239; 310/238; 310/244; 310/248

[58] Field of Search ............ 310/40 MM, 43, 89, 154, 310/177, 238, 239, 244, 246, 71

[56] References Cited

U.S. PATENT DOCUMENTS

| | | | |
|---|---|---|---|
| 3,296,473 | 1/1967 | Mabuchi | 310/244 |
| 3,450,916 | 6/1969 | Mabuchi | 310/244 |
| 4,228,376 | 10/1980 | Mabuchi | 310/248 |
| 4,494,029 | 1/1985 | Hoshino et al. | 310/239 |
| 4,617,486 | 10/1986 | Miyauchi et al. | 310/40 MM |
| 4,677,330 | 6/1987 | Watanabe et al. | 310/89 |
| 4,728,835 | 3/1988 | Baines | 310/239 |
| 4,746,829 | 5/1988 | Strobl | 310/244 |
| 4,774,430 | 9/1988 | Rodriquez et al. | 310/239 |
| 4,853,576 | 8/1989 | Mayumi et al. | 310/71 |

FOREIGN PATENT DOCUMENTS

| | | | |
|---|---|---|---|
| 0068845 | 5/1980 | Japan | 310/244 |
| 2207295 | 1/1989 | United Kingdom | 310/244 |

Primary Examiner—Steven L. Stephan
Assistant Examiner—C. LaBalle
Attorney, Agent, or Firm—Fleit, Jacobson, Cohn, Price, Holman & Stern

[57] ABSTRACT

An electric motor has a casing having two opposed planar side walls and two opposed curved walls. A permanent magnet is located inside each curved wall and a wound armature is mounted in the casing. A commutator is connected to the winding and two brush arms are supported by a holder at one end of the casing. Each brush arm informed by two electrically conductive strips forming, respectively, a terminal part and a more resilient brush supporting part. The terminal parts extend out of one end of the casing in a plane of symmetry of the casing thereof and the brush supporting parts are secured to respective terminal parts at positions which are offset from the plane of symmetry, on opposite sides thereof.

8 Claims, 2 Drawing Sheets

BRUSH GEAR FOR A PERMANENT MAGNET MOTOR

INTRODUCTION

This invention relates to a permanent magnet direct current electric motor of the kind which includes a motor casing having a pair of opposed planar side walls and a pair of opposed curved walls between the planar side walls.

BACKGROUND

Known motors of this kind have permanent magnets located inside each curved wall, an armature having winding coils mounted on respective arms of a lamination stack, a commutator having tangs connecting the winding coils to respective commutator segments, brush gear in contact with the commutator, and motor terminals connected to the brush gear for supplying electrical power to the winding coils. In order to facilitate winding, it is desirable to have the commutator tangs angularly disposed between adjacent pairs of arms of the armature and it is also desirable to centrally dispose the tangs with respect to the angular extent of a respective commutator segment. this, in turn, dictates the position at which the motor brushes contact the commutator segments relative to the position of the motor magnets.

Known brush gear arrangements which allow the aforesaid requirements to be met involve motor terminals which either project out of a planar side wall of the motor casing or which project through an end cap on the motor casing in positions offset one on either side of a plane of symmetry of the motor casing, which plane passes through the motor axis and bissects the curved walls of the casing.

Some users of motors want to be able to drop the motors into a cavity so that the motor terminals line up with connections. The aforementioned positions of the motor terminals are not well suited to this requirement.

SUMMARY OF THE INVENTION

In seeking to mitigate this drawback, the present invention provides an electric motor comprising a casing having a pair of opposed planar side walls and a pair of opposed curved walls between the planar side walls, a permanent magnet located inside each curved wall, a wound armature mounted for rotation in the casing, a commutator connected to the armature winding, and two brush arms supported by a holder at one end of the casing, each brush arm comprising two electrically conductive strips forming, respectively, a terminal part and a more resilient brush supporting part, the terminal parts being supported by the holder to extend outwardly of the casing at said one end thereof in a plane of symmetry of the motor casing, which plane passes through the motor axis and bissects the curved walls of the casing, and the brush supporting parts being secured to respective terminal parts at positions which are offset from the plane of symmetry on opposite sides thereof.

DESCRIPTION OF THE PREFERRED EMBODIMENT

Figure 1:
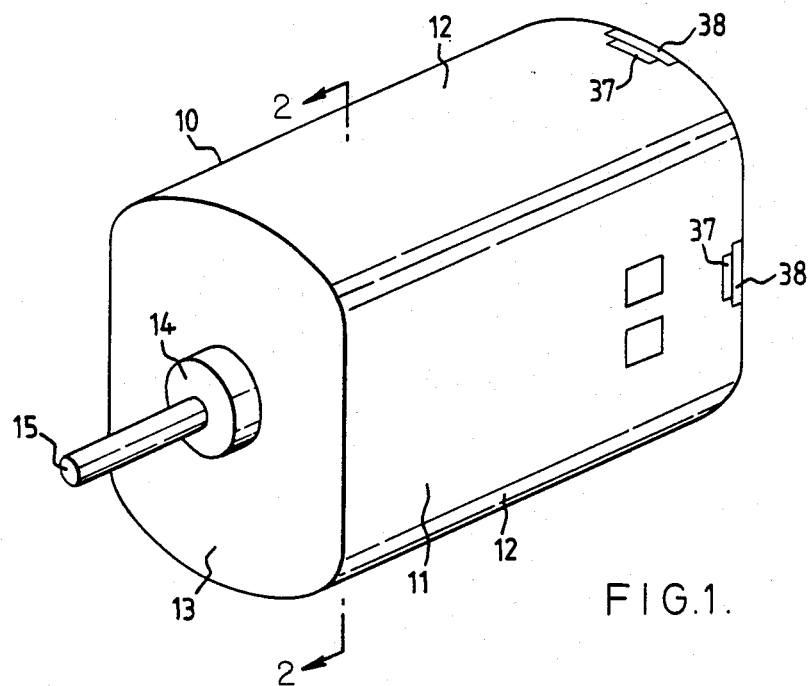
FIG. 1 is a perspective view of one embodiment of an electric motor in accordance with the invention.
Figure 2:
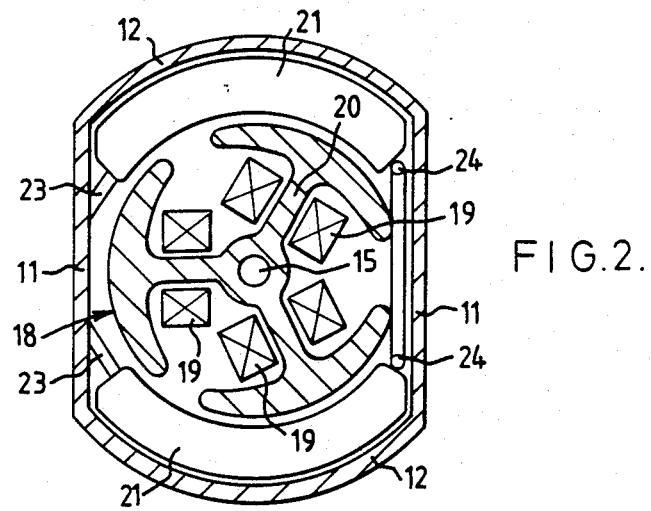
FIG. 2 is a sectional view of the electric motor taken along line II—II in FIG. 1.
Figure 3:
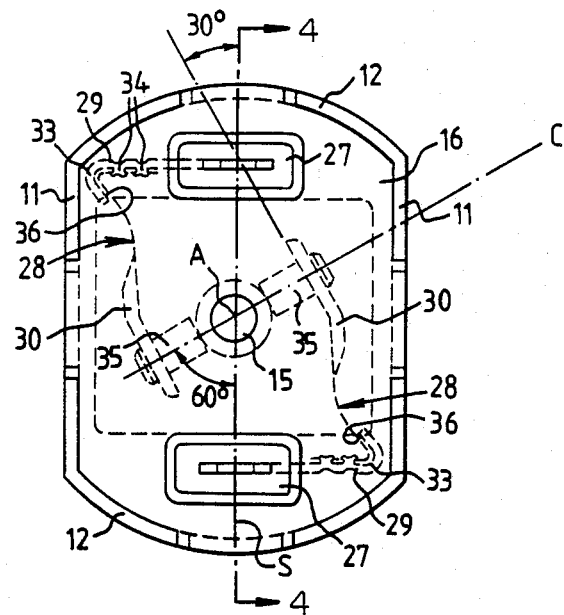
FIG. 3 is an end view of the electric motor of FIGS. 1 and 2.
Figure 5:
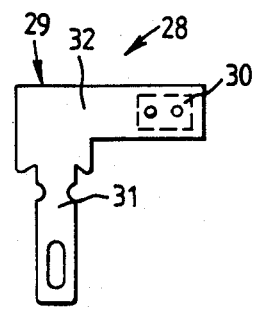
FIG. 5 is a brush arm of the electric motor of FIGS. 1 to 4.
Figure 4:
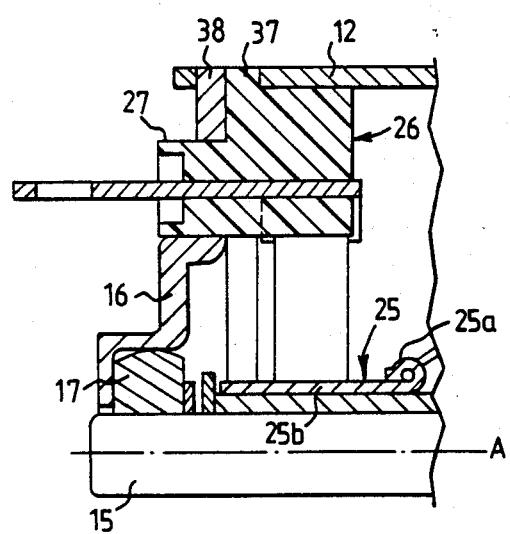
FIG. 4 is a fragmentary sectional view of the electric motor taken along line IV—IV in FIG. 3.

Referring now to the drawings the permanent magnet direct current motor shown therein comprises a drawn can-like steel casing 10 having a pair of opposed planar side walls 11, a pair of opposed curved walls 12 between the side walls 11, and an integrally formed end wall 13. The end wall 13 carries a bearing 14 in which an end of a motor shaft 15 is journalled. A metal end cap 16 carries a bearing 17 to receive the opposite end of the shaft 15.

The shaft 15 carries an armature 18 which, in the example shown, has three coils 19 wound about respective arms 20. A permanent magnet 21 is located inside each curved wall 22 between ears 23 which are stamped in one of the side walls 11 and a U-shaped spring 24. The shaft 15 also carries a commutator 25 which is electrically connected to the coils 19 of the armature 18 by tangs 25a on commutator segments 25b, of which there are three.

A plastics brush holder 26 is disposed inside the end cap 16. The brush holder 26 includes two integral bushes 27 which extend through the end cap 16. The bushes 27 are disposed adjacent to opposite curved walls 22, respectively, and are each symmetrically arranged with respect to a plane of symmetry S passing through the motor axis A and bissecting each curved wall 12.

The brush holder 26 supports two brush arms 28. Each brush arm 28 comprises a terminal part 29 of, for example, brass and a more resilient brush supporting part 30 of, for example, beryllium copper. The terminal part 29 is substantially L-shaped and has two limbs 31 and 32. The limbs 31 extend through respective bushes 27 and outwardly of the casing 10 in the plane of symmetry S. The limbs 32 extend from the inner ends of respective limbs 31 towards opposite side walls 11, respectively, of the casing and terminate in acute angled bends 33 adjacent to respective side walls 11. A portion of the brush supporting part 30 overlies a portion of the limb 32 and this portion of the part 30 extends around the inside of the bend 33 and is secured to the limb 32 on the side of the bend adjacent to the limb 31 by one or more upset rivets 34.

Thus it will be seen that the brush supporting parts 30 are secured to respective terminal parts 29 at positions which are offset from the plane of symmetry S on opposite sides thereof.

A carbon brush 35 is supported by the free end of part 30 in conventional manner.

With this brush arm arrangement the part 30 can extend generally at 30 degrees to the plane of symmetry S and the brush 35 can make contact with the commutator in a plane C which passes through the axis of the motor and which is at an angle of 60 degrees to the plane of symmetry S. This commutating position means that the commutator tangs 25a can be angularly disposed between adjacent pairs of arms 20 of the armature 18 to facilitate winding of the armature and that the tangs 25a can be centrally disposed with respect to the angular extent of respective commutator segments 25b.

The angle of the bend 33 is less than 60 degrees, and preferably as shown about 45 degrees, so that when the brush 34 is in contact with the commutator 25 the part 30 is urged against an edge 36 of the terminal part 29, the edge 36 defining a fulcrum for the part 30 with respect to the part 29.

Preferably the limbs 31 of the terminal parts 29 are firmly secured in respective bushes 27 by deforming parts of the limbs 31 after insertion in bushes 27.

In order to avoid separation of the parts 29 and 30 at the bend 33, a mechanical link may be made between the parts 29 and 30 at the bend 33 by forcing material from one of the parts 29, 30 into the other part 30, 29 using a punch and die.

To secure the brush holder 26 and the end cap 16 to the casing 10, projections 37 and 38 on the holder 26 and end cap 16, respectively, are located in notches in the end of the casing 10, and the casing 10 is deformed to secure the projections 37 and 38 in the notches.

The above embodiment is given by way of example only and various modifications will be apparent to persons skilled in the art without departing from the scope of the invention defined by the appended claims.

What is claim is:

1. A permanent magnet direct current electric motor comprising a casing having a pair of opposed planar side walls and a pair of opposed curved walls between the planar side walls, a permanent magnet located inside each curved wall, a wound armature mounted for rotation about a motor axis in the casing, a commutator connected to the armature winding, and two brush arms supported by a holder at one end of the casing, each brush arm comprising two electrically conductive strips forming, respectively, a terminal part and a more resilient brush supporting part, the terminal parts each having first and second limbs and being supported by the holder, the respective first limbs extending outwardly of the casing at said one end thereof in a plane of symmetry of the motor casing, which plane passes through the motor axis and bisects the curved walls of the casing, and the brush supporting parts being secured to the respective second limbs within the casing at positions which are offset from the plane of symmetry on opposite sides thereof, the second limbs each having a bend to form an acute angle having an apex adjacent a respective planar side wall of the casing.

2. A motor as claimed in claim 1, wherein the second limb of each terminal part and the brush supporting part of each brush arm have overlying portions and each brush arm has a bend at the overlying portions, the overlying portion of the brush supporting part facing inwardly of the bend and being secured to the second limb of the terminal part at a location between the bend and the first limb of the terminal part.

3. A motor as claimed in claim 1, wherein a brush on each brush supporting part makes contact with the commutator in a plane which passes through the motor axis and which is at 60 degrees to said plane of symmetry.

4. A motor as claimed in claim 1, wherein a brush on each brush supporting part makes contact with the commutator in a plane which passes through the motor axis and which is at 60 degrees to said plane of symmetry.

5. A motor as claimed in claim 1, wherein the brush holder is a plastics part at said one end of the casing.

6. A motor as claimed in claim 5, wherein the brush holder is disposed inside a metal end cap which supports a motor bearing.

7. A permanent magnet direct current electric motor comprising a casing having a pair of opposed planar side walls and a pair of opposed curved walls between the planar side walls, a permanent magnet located inside each curved wall, a wound armature mounted for rotation about a motor axis in the casing having armature coils wound respectively around three evenly distributed arms, a commutator having three evenly distributed segments each having at one end a tang positioned between respective adjacent pairs of coils of the armature and each electrically connected to said respective pair of coils, and two brush arms supported by a holder at one end of the casing, each brush arm comprising two electrically conductive strips forming, respectively, a terminal part and a more resilient brush supporting part, the terminal parts each having first and second limbs and being supported by the holder with the first limbs extending outwardly of the casing at said one end thereof in a plane of symmetry of the motor casing, which plane passes through the motor axis and bisects the curved walls of the casing, and the brush supporting parts being secured to the respective second limbs of the terminal parts at positions which are offset from the plane of symmetry on opposite sides thereof, the second limbs each having a bend to form an acute angle having an apex adjacent a respective side wall of the casing.

8. A motor as claimed in claim 1, wherein a brush on each brush supporting part makes contact with the commutator in a plane which passes through the motor axis and which is at 60 degrees to said plane of symmetry.

* * * * *